July 20, 1965  J. RABINOW  3,196,277
PHOTOSENSITIVE OPTICAL SCANNING DEVICE FOR METER INDICATORS
Filed Oct. 29, 1963
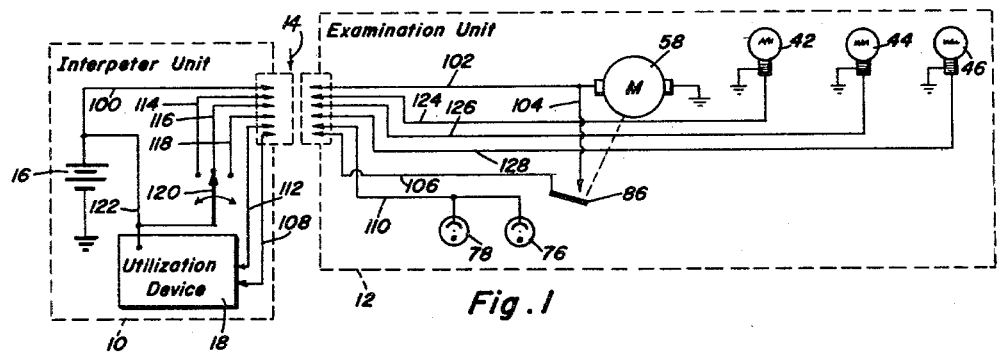
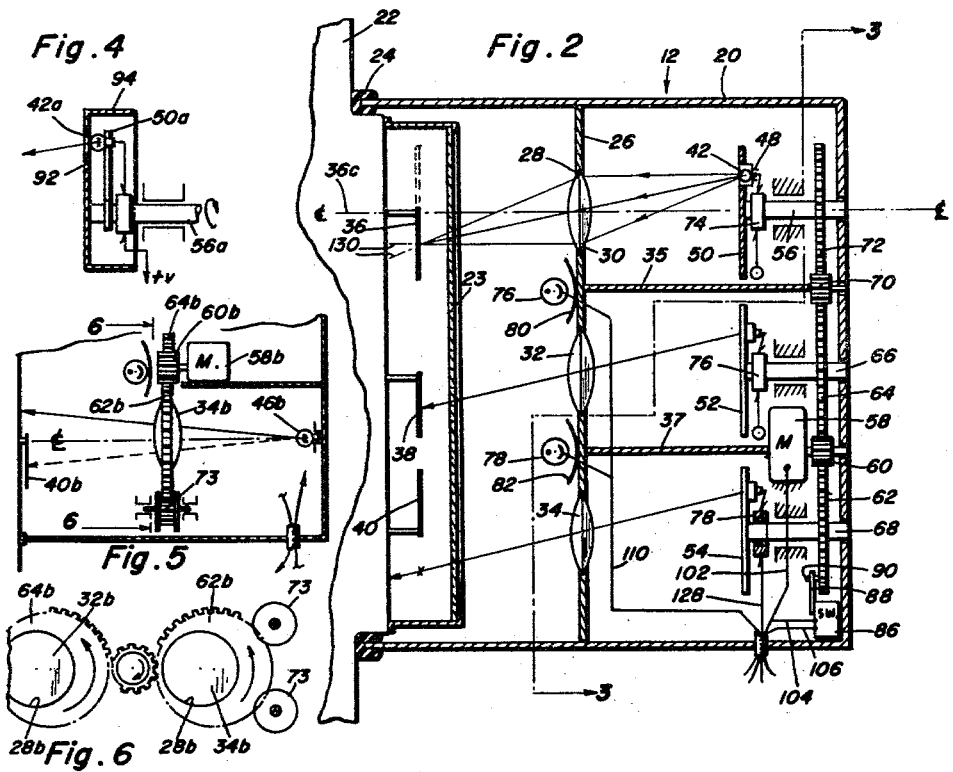
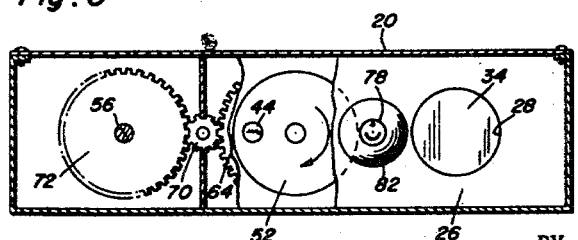
INVENTOR
Jacob Rabinow
BY Joseph A. Genovese &
Max L. Libman
ATTORNEYS United States Patent Office 3,196,277
Patented July 20, 1965

3,196,277
PHOTOSENSITIVE OPTICAL SCANNING DEVICE FOR METER INDICATORS
Jacob Rabinow, Bethesda, Md., assignor, by mesne assignments, to Control Data Corporation, Minneapolis, Minn., a corporation of Minnesota
Filed Oct. 29, 1963, Ser. No. 319,769
4 Claims. (Cl. 250—236)

This invention relates to remote reading systems, and particularly to the reading of meters or other devices having visual indicators. The subject matter of this application is related to that disclosed in my copending application Serial No. 227,752, filed October 2, 1962.

The term "meter" as used herein means any meter, instrument or device which has a movable indicator whose position provide intelligence.

My co-pending application discusses prior suggestions for remotely indicating, recording, etc. the instantaneous positions of indicators of utility meters, for instance gas meters, electric meters, and others. One of the serious limitations of systems prior to my original invention is the requirement for physical connection (by mechanisms, electrical conductors, or otherwise) between the reading devices and the internal mechanisms or circuits of the meters. In view of the enormous number of existing meters, the expense of converting existing (or new) meters to prior remote reading systems, and, usually, the complexity of prior remote reading equipment, only a very small fraction of meters are remotely read at the present time. Conventional TV systems are far too inefficient and far too costly to be generally applied for such purposes.

In my co-pending application I disclose a remote reading system having a scanning or examination unit which is only optically coupled with the indicators of the meter. In other words, no physical connection of any kind is required between the interior of existing (or new) meters and the examination unit. Such units are permanently installed on the exterior of the meter in a manner such that the indicator or indicators of the meter can be optically scanned, and the intelligence extracted from the indicator or indicators (positional information thereof) is transmitted to an interpreter unit which provides a visual display of the indicator positon, or a printed or punched record, or the like.

The interpreter unit is preferably (but not necessarily) portable and may be carried by an employee of the utility company. It is designed to be manually plugged into a socket accessible from the exterior of the building which is operatively connected with the examination device on the meter inside the building. This suggested procedure is similar to that described in U.S. Patent No. 3,006,712.

One of the essential requirements for commercial acceptance of any remote meter reading system, is that at least the examination unit be easily installed, inexpensive and, if electrical, be a low voltage device. The reason for these requirements are fairly obvious. The simplicity of installation and manufacturing cost economy take into account the millions of existing meters and the millions to be used in the future. The use of a "low-voltage" system has not only an economy, but also a safety advantage.

An object of my invention is to provide improvements in the examination or scanning unit in a system discussed more fully in my co-pending application. Any improvements leading to manufacturing economy, simplicity, more favorable response and the like, which are made in the examination or scanning unit have a large effect on a system such as mine because a very large number of examination units (one for each meter) are required for installation in an area such as a section of a city, a town, city, state, etc.

A more specific object of my invention is to provide an examination unit for a meter having, for example, a plurality of rotary indicators, wherein the examination unit has a source of light, and means associated with the source of light for providing a scanning spot of light which rotates in a circular orbit concentric with the axis of rotation of the indicator with which it is associated. This scanning method can be accomplished easily by at least two equivalent optical systems. I can use an inexpensive lens whose center is coaxial with the indicator, and rotate the light source in a manner such that a spot of light is formed at the focus of the lens which (due to the position of the lens and its focal length) is located in a plane approximately coplanar with the plane of rotation of the indicator. Another method is to use a fixed light source substantially coaxial with the indicator, and to mount a rotary lens between the light source and indicator. In the later alternative, the axis of the lens is eccentric to the axis of the indicator so that the spot of light formed by the lens travels in a circular orbit substantially concentric with the axis of the indicator.

In both of the above systems, I use one or more photocells positioned and arranged to respond to the total light reflected from the indictor area (and the lack of light when the scanning spot falls upon the dark (light absorbent) indicator) so that I achieve an economy in the number of photocells required as explained below.

In my pending application, I use a single photocell for each indicator area, and if the meter has, for example, five indicators, a corresponding number of photocells will be required. Having been concerned about the expense of the multi-photocell arrangement, one of the embodiments disclosed in my pending application uses a single photocell together with a carriage or the equivalent for moving the photocell from one reading position (indicator area) to the next. Although practical, the carriage mechanism is not as desirable as my present system. In my present invention wherein a spot of light is rotated in a manner such that it will intercept an indicator, an appreciable improvement in signal to noise ratio can be expected over systems when the entire area of an indicator is illuminated. With improved signal to noise ratio, it becomes not only possible but practical to have one photocell service more than one indicator area.

An object of my invention is to provide a scanning unit adapted to confront the face of a meter having a plurality of indicators, wherein the scanning unit has means to provide a plurality of light spots (one for each indicator) and to rotate the light spots concentrically with their respective indicators to enable one or more photocells to respond to the light reflected from the indicator areas.

A feature of my scanning unit is that it is easily housed in light tight casing to exclude ambient light, and it is easy to successively form the individual scanning spots by switching the individual lights on and off. The advantage of this is that the entire indicator area (having one or more indicators) is in darkness except for the immediate area of one indicator, and then another, and then another, etc. Thus, all of the photocells (if more than one is required) can be continually exposed to the meter indicator area since substantially all of the light provided by the rotating spot is confined to the area of the particular indicator being scanned.

Other objects and features will become apparent following the description of the illustrated forms of the invention which are given by way of example only.

FIGURE 1 is a schematic view showing wiring diagrams of a typical examination unit and interpreter unit.

FIGURE 2 is a sectional view of one embodiment of my examination unit shown mounted on the front of a meter.

FIGURE 3 is a sectional view taken on the line 3—3 of FIGURE 2.

FIGURE 4 is a fragmentary sectional view showing a modification of the examination unit.

FIGURE 5 is a fragmentary sectional view showing another modification of my examination unit.

FIGURE 6 is a fragmentary sectional view taken substantially on the line 6—6 of FIGURE 5.

FIGURE 1 shows an interpreter unit 10 which is adapted to be connected to an examination unit 12 by means of connector 14 having respective parts connected with units 10 and 12. The interpreter unit can be a portable device as disclosed in the previously mentioned pending application and patent, and in general it serves the same purpose. Device 10 can, for example, consist of power source 16, various wiring (described later) and a utilization device 18 having a display providing a visual manifestation (as in my pending application), and/or a printer and/or a punch, etc. to make a record of the meter reading at the time of read-out. As disclosed in the prior patent and my pending application, interpreter unit 10 can be a portable device, or a fixed device at a stationary location and connected via telephone, telegraph, etc. lines to many examination units located in a plurality of different locations.

Examination unit 12 (FIGURES 2 and 3) is made of a light tight casing 20 with an opening in the front adapted to fit over the indicator area of typical meter 22. Any suitable strap, clamp, etc. (not shown) can be used to attach casing 20 to a meter; and to exclude ambient light gasket 24 is positioned around the casing opening.

In the embodiments of FIGURES 2–4, I have a transverse partition 26 subdividing the casing into front and rear sections. The rear section is further subdivided by walls 35 and 37 into three optical chambers. Partition 26 has a plurality of apertures 28 in which lenses 30, 32 and 34 are fixed. I have three apertures, chambers and lenses because examination unit 12 is specifically designed for a meter where only three rotary indicators 36, 38 and 40 are to be read. It is understood that the examination unit is designed for the meter with which it is to be used in the sense that if only three indicators are to be read, there will be only three optical systems represented by lenses 30, 32 and 34; but if more or fewer indicators are to be read, the corresponding number of optical systems will be provided.

Since I have illustrated three lenses, I have three light sources 42, 44, 46 (FIGURES 1 and 2). The light sources can be conventional, low voltage lamps, and they are mounted in sockets 48 attached in apertures of discs 50, 52 and 54. The discs physically support the sockets and lamps in a manner such that the lamps can be rotated. The axis of rotation of each lamp is concentric with the axis of rotation of the indicator with which it is associated. For instance (FIGURE 2), for the indicator 36, its lens 30 has its center on the centerline 36c of the indicator shaft; and the center of rotation of disc 50 is coincident with the same centerline. However, the lamp 42 is laterally spaced from the centerline so that upon rotation of the shaft 56 to which disc 50 is secured, lens 30 forms a scanning light spot in plane substantially coplanar with indicator 36, and the scanning spot executes a circular orbit about the axis of rotation of the indicator 36. In a like manner, the optical system for indicators 38 and 40 (light sources 44, 46 and lenses 32, 34) have means for forming a light spot to scan the respective areas of indicators 38 and 40.

To rotate the light sources, I have a single drive motor 58 with a pinion 60 attached to its output shaft. The pinion is engaged with two gears 62 and 64, and these are secured to the shafts 66 and 68 to which lamp supporting discs 52 and 54 are attached. Pinion 70 is engaged with gear 64 and with gear 72 which is fixed to the previously mentioned shaft 56 so that all of the lamps 42, 44 and 46 rotate in unison. As shown in FIGURE 2, the various gears and shafts have suitable bearings and bearing apertures (not numbered).

As described more fully later, to energize the lamps slip rings 74, 76 and 78 are attached to shafts 56, 66 and 68. One brush of each slip ring is connected to a source of electrical potential (battery 16 of FIGURE 1 described later), and the other brush of each slip ring is connected to its respective lamp 42, 44, 46.

For a three-indicator examination device I use two photocells 76 and 78 mounted within reflectors 80 and 82 which face the indicator-area of the meter. The photocells and reflectors are positioned at locations where they will not interfere with the scanning beam which forms the scanning light spot. Yet, they are in position to receive light reflected from the indicator area (usually "white," while the indicators themselves are usually "black"). Apart from the wiring shown in FIGURE 2 and described more fully later, my examination device requires only a means to provide sync signals for utilization device 18 (FIGURE 1) in order to simplify its construction as disclosed in the pending application. Thus, sync signal generator 86 consists of a switch having a switch arm 88 (FIGURE 2) located in the path of travel of a pin 90 so that switch 86 closes momentarily once for each revolution of gear 62 to which the pin is attached. Obviously, other equivalent sync signal generators can be substituted.

FIGURE 4 shows a modification wherein lamp 42a is mounted in a socket attached to arm 50a which is fixed to shaft 56a. In FIGURE 2 the lamp socket is recessed in an opening in disc 50 so that the socket and its reflector form a light shield to direct most of the light forward as shown by the light rays in the optical path between lamp 42 and indicator 36. FIGURE 4 shows that other forms of shielding can be resorted to, as member 92 having a rearwardly extending skirt 94.

The use and operation of the embodiments of my invention shown in FIGURES 1–4 are described with particular reference to FIGURES 1 and 2. Examination unit 12 is assumed to be mounted on meter 22 as shown in FIGURE 2. The interpreter unit 10 is connected by coupling 14 with the examination unit in a manner such that power line 100 from power source 16 is coupled to line 102 which energizes motor 58. Thus, the three illustrated lamps 42, 44 and 46 are caused to be rotated by way of the illustrated gearing and the lamp supports. Line 104 is connected to line 102 and to the sync signal generator 86, and line 106 from the sync signal generator is connected with utilization device 18 by way of line 108. Thus, switch 86 is actuated (by pin 90 in FIGURE 2) once for every revolution of the lamps 42, 44 and 46. Line 108 is operatively connected with utilization device 18 to provide the sync signals thereto to be used, for example, as disclosed in my pending application. Conductor 110, which is an information signal line, extends from the photocells to connector 14, and conductor 112 (connected with line 110 by means of coupling 14) is connected with utilization device 18.

Three separate lines 114, 116 and 118 are secured to the output terminals of a selector switch 120 of interpreter unit 10, and the switch contactor is connected by wiring 122 to the power source 16. The three lines 114, 116 and 118 plus selector switch 120 enable the lamps 42, 44 and 46 to be selectively energized via conductors 124, 126, and 128, although it is possible to omit the selector switch 120 and energize the three lamps from a common conductor in those cases where it is desired to simultaneously read the positions of three illustrated indicators 36, 38, and 40 (FIGURE 2). In this case three photocells, light-shielded from each other, would be required.

In view of the preceding, it is evident that when the parts of the electrical connector 14 are joined, motor 58 operates thereby rotating the three lamps 42, 44 and 46. In addition, the sync signal generator 86 becomes operable to provide sync signals for utilization device 18. In the illustrated configuration the selector switch 120 is successively positioned (e.g. manually) to energize the three lamps 42, 44 and 46, allowing utilization device 18 to make successive manifestations, printings, punching, etc. as a result of the scanning of the three illustrated indicator areas.

In more detail, assume that lamp 42 is first to be energized. The optical system including lens 30 (FIGURE 2) will form a scanning spot approximately coplanar with indicator 36 through the front window 23 of meter 22. Since the other two lamps 44 and 46 are not energized, and since the entire system is in a light-tight casing 20, the only light reaching the indicator area of the meter is that of the scanning spot which moves in a circular orbit concentric with the axis of rotation of indicator 36. When the scanning spot impinges on the white background area of indicator 36, the photocells 76 and 78 (principally the nearer photocell) respond to the light between partition 26 and the face of the meter. However, during the rotation of the scanning spot, the spot will fall on the dark indicator 36, and a significant quantity of the light will be absorbed so that the photocells detect this condition and reflect it in a sudden drop (and subsequent rise) of the output signal on lines 112, 110. Thus, an information signal is developed which, when used in connection with the sync signal from generator 86, will enable the utilization device 18 to manifest or record the position of indicator 36. Then, selector switch 120 is moved to the second position so that the second indicator 38 can be scanned in a like manner. This same holds true of the indicator 40.

One of the interesting features of my scanning system is this: with the spot of light smaller than the width of the indicator and focused at approximately the plane of its indicator, say indicator 36, very little light is experienced by the photocells when the spot falls upon the indicator. Substantially the only light detected by the photocells under these conditions, is that light which the dark hand does not absorb. However, when the scanning spot is not on indicator 36, the light rays diverge as shown by the dotted lines 130 (FIGURE 2) so that the cone of light reaching the face of the meter is significantly broad covering a relatively large area. Therefore, even if the cone of light intercepts graduations, these will be a fraction of the total "white" area and will have less degrading effects on the light reflected from the meter face and thereby experienced by the photocells. Another way of saying this is that the spot is focused on the indicator hand, but is not focused on the background.

Attention is now directed to FIGURES 5 and 6 showing a modification which is the functional equivalent of the embodiment of FIGURE 2 (or FIGURE 4). The major distinction is in the optical system including lamp 46b, lens 34b, and means to rotate the lens. In FIGURE 5, lamp 46b is stationarily mounted on a centerline coincident with the axis of rotation of indicator 40b. Lens 34, however, has its center eccentric with respect to the centerline. Thus, by rotating lens 34b and the others (one more shown in FIGURE 6) about an axis parallel to the above centerline but laterally spaced therefrom, the center of the lens is required to execute an orbital path of movement concentric with the centerline of the axis of rotation of the indicator 40b. Therefore, the scanning spot of light formed by lens 34b rotates in a circular orbit in the plane of indicator 40b and about the center of rotation of the indicator. As far as the indicator is concerned the optical systems of FIGURES 5 and 2 are identical, the difference being in the method of rotating the scanning spot.

In this form of my invention motor 58b drives pinion 69b which, in turn, is enmeshed with gears 64b and 62b. Where necessary in the gear train, idler pinions 73, preferably with side flanges, are mounted in the system to retain the gears of the gear train engaged.

Gears 62b and 64b have eccentric openings 28b in which lenses 34b and 32b are fixed. Thus, the desired orbital motion of the lenses is obtained when motor 58b is energized. In other respects, the embodiments of FIGURE 2 and 5 are the same.

It is understood that the illustrated embodiments of my invention are given by way of example only. All other modifications, changes, embodiments, etc. falling within the scope of the following claims may be resorted to.

I claim:

1. An optical examination device for a meter having a light face and a plurality of angularly rotatable dark indicators traversing predetermined areas, said indicators optically contrasting with said face, said examination device including a substantially light-tight casing having an opening adapted to be positioned in confronting relationship to the areas of said indicators, an optical system for each indicator, each optical system including a source of light in said casing, means optically associated with said light source to form a scanning spot of light on one of said indicator areas and focused substantially in the indicator area and defocused at said face, means for moving said spot of light in an orbit concentric with said movable indicator, and photosensitive means servicing more than one indicator and responding to the total light in said light tight casing and positioned to sense the light reflected from said entire face as said spot moves and to extract positional information regarding said indicator by sensing the decrease in total light in said casing as said spot sweeps across said indicator.

2. The subject matter of claim 1 and means by which the light sources of each optical systems are sequentially energized.

3. The subject matter of claim 1 wherein said light spot forming means including lens whose center is eccentric to the axis of rotation of the indicator with which it is used, and said means for moving said scanning light spot include means to rotate said lens so that the axis of the lens describes a circle over said indicator area in optical alignment with said lens.

4. The subject matter of claim 1 wherein said light spot forming means include lenses coaxially with the indicators with which they are used, and said means to rotate said scanning light spot include means for rotating said light sources in circular paths concentric with the axis of rotation of the indicators with which they are used.

References Cited by the Examiner

UNITED STATES PATENTS

| | | | |
|---|---|---|---|
| 2,351,081 | 6/44 | Swift | 250—236 X |
| 2,491,591 | 12/49 | Sweeny et al. | 250—236 X |
| 2,583,373 | 1/52 | Hammond | 250—236 X |
| 2,880,328 | 3/59 | Norquist et al. | 250—222 |
| 2,891,243 | 6/59 | Kunze | 250—236 X |
| 2,964,639 | 12/60 | Hobrough | 250—236 X |
| 2,992,334 | 7/61 | Kaestner et al. | 250—236 X |
| 3,059,119 | 10/62 | Zenor | 250—239 X |

RALPH G. NILSON, *Primary Examiner.*